(12) United States Patent
Feusse et al.

(10) Patent No.: US 9,091,307 B2
(45) Date of Patent: Jul. 28, 2015

(54) COMPACT PULSE VACUUM LIVE SPINDLE HUB LOCK

(71) Applicant: Warn Industries, Inc., Clackamas, OR (US)

(72) Inventors: Craig Feusse, Fenton, MI (US); Adrian Simula, Battle Ground, WA (US); Bryan M. Averill, Portland, OR (US); Mitchell R. Lawson, Perrysburg, OH (US); Jeff Walston, Gig Harbor, WA (US); Ian Wendler, Portland, OR (US); Craig Clark, Gresham, OR (US)

(73) Assignee: Warn Industries, Inc., Clackamas, OR (US)

( * ) Notice: Subject to any disclaimer, the term of this patent is extended or adjusted under 35 U.S.C. 154(b) by 0 days.

(21) Appl. No.: 14/156,774

(22) Filed: Jan. 16, 2014

(65) Prior Publication Data

US 2014/0251747 A1    Sep. 11, 2014

Related U.S. Application Data

(60) Provisional application No. 61/774,169, filed on Mar. 7, 2013.

(51) Int. Cl.
*F16D 25/04* (2006.01)
*B60K 17/35* (2006.01)
(Continued)

(52) U.S. Cl.
CPC ............ *F16D 25/04* (2013.01); *B60K 17/3515* (2013.01); *B60K 23/08* (2013.01); *F16D 25/044* (2013.01); *F16D 11/14* (2013.01); *F16D 2011/004* (2013.01)

(58) Field of Classification Search
USPC ....................................................... 192/69.41
See application file for complete search history.

(56) References Cited

U.S. PATENT DOCUMENTS

| | | | |
|---|---|---|---|
| 4,627,512 | A | 12/1986 | Clohessy |
| 5,353,890 | A | 10/1994 | Clohessy |

(Continued)

FOREIGN PATENT DOCUMENTS

| | | | |
|---|---|---|---|
| JP | H04356234 A | 12/1992 | |
| JP | H07119766 A | 5/1995 | |

(Continued)

OTHER PUBLICATIONS

Japanese Patent Office, First Office Action and Search Report Issued in Japanese Patent Application No. 2014-039048, Mar. 24, 2015, 7 pages.

*Primary Examiner* — Richard Lorence
(74) *Attorney, Agent, or Firm* — Alleman Hall McCoy Russell & Tuttle LLP

(57) ABSTRACT

A pulse vacuum hub lock system for selectively engaging a wheel hub to an axial shaft includes a cartridge housing assembly received in a bore in the wheel hub. The cartridge housing assembly supports a clutch ring for movable engagement between splines in the wheel hub and directly on the axle shaft. A diaphragm is connected to a piston assembly and is responsive to a vacuum pressure to activate the piston assembly to engage or disengage a latch mechanism that holds the clutch ring in an engaged or disengaged position. A piston spring and a helper spring are provided between primary and secondary pistons of the piston assembly and allow for separation in the vacuum levels required to activate the latch mechanism. The vacuum hub lock system is compact so as to be disposed inboard of an opening in the exterior surface of a wheel rim.

22 Claims, 6 Drawing Sheets

(51) Int. Cl.
*B60K 23/08* (2006.01)
*F16D 11/14* (2006.01)
*F16D 11/00* (2006.01)

(56) References Cited

U.S. PATENT DOCUMENTS

| | | |
|---|---|---|
| 5,394,967 A | 3/1995 | Bigley |
| 5,445,258 A | 8/1995 | Bigley et al. |
| 5,535,869 A | 7/1996 | Bigley et al. |
| 5,586,632 A | 12/1996 | Bigley et al. |
| 5,908,080 A | 6/1999 | Bigley et al. |
| 6,422,369 B1 * | 7/2002 | McCalla .................. 192/69.41 |
| 6,598,722 B2 * | 7/2003 | Pugliese et al. ........... 192/69.41 |
| 7,000,750 B2 | 2/2006 | Ewer |
| 7,055,667 B2 | 6/2006 | Roe et al. |

FOREIGN PATENT DOCUMENTS

| | | |
|---|---|---|
| JP | H08277849 A | 10/1996 |
| JP | H10211827 A | 8/1998 |

* cited by examiner

COMPACT PULSE VACUUM LIVE SPINDLE HUB LOCK

CROSS-REFERENCE TO RELATED APPLICATIONS

This application claims the benefit of U.S. Provisional Application No. 61/774,169, filed on Mar. 7, 2013. The entire disclosure of the above application is incorporated herein by reference.

FIELD

The present disclosure relates to a locking hub system for a vehicle, and more particularly to a pulse vacuum actuated locking hub cartridge with reduced assembly length.

BACKGROUND

This section provides background information related to the present disclosure which is not necessarily prior art.

Vehicles having four-wheel drive capabilities that are designed for on-road and off-road use typically provide optional engagement/disengagement of two of the four wheels. The wheels to be disengaged are necessarily provided with a driveline from the vehicle powertrain wherein for on-road use and to avoid unnecessary energy consumption and wearing of the out-of-service driveline components, hub locks are provided for disconnecting the axles from the wheels of the vehicle. The original hub lock devices were manually actuated. A driver/operator would stop the vehicle, engage the transfer case disconnect system and then manually turn a dial located in each wheel hub to activate the hub lock to disconnect the wheels from the axles.

Subsequently, mechanisms have been developed to automatically activate the hub locks. Automatic locking hubs for four-wheel drive vehicles are now available in many different design configurations. Such configurations include direct manual clutch engagement, remote vacuum clutch engagement, and remote pressure clutch engagement. The systems of the previous designs include complex designs requiring numerous parts involved that render the device expensive to produce and/or are complex to assemble. The present disclosure provides a more compact package of components for easier assembly to the vehicle, with improved aesthetics.

SUMMARY

This section provides a general summary of the disclosure, and is not a comprehensive disclosure of its full scope or all of its features.

The present disclosure provides a compact pulse vacuum live spindle hub lock that provides a cartridge design for ease of assembly. The hub lock includes a clutch ring with multi-row engagement teeth and the external splines on the constant shaft reduce the amount of axial travel of the clutch ring. The hub lock utilizes a pulse vacuum engagement method that allows the limited use of vacuum therefore allowing the vacuum system of the vehicle to have a lower durability cycle than a constant vacuum hub lock.

The hub lock also uses two springs for the pulse vacuum engagement/disengagement system. A larger, full range spring is used throughout a full stroke of a primary piston, which is reacted against by a diaphragm. A secondary spring is used to help reduce the full stroke of the primary piston by requiring greater vacuum to fully compress the primary piston. The two spring system allows greater separation in the vacuum levels required to activate the pulse/latch system. This allows for increased tolerances of the system and therefore making it more robust but at the same time allowing for a smaller axial stack dimension.

The combination of the present disclosure allows for a minimal axial stack, making the present design a very dense package. This then allows for a traditional automatic outboard wheel end disconnect to be fully packaged behind a center cap of a traditional styled original equipment manufacturer wheel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
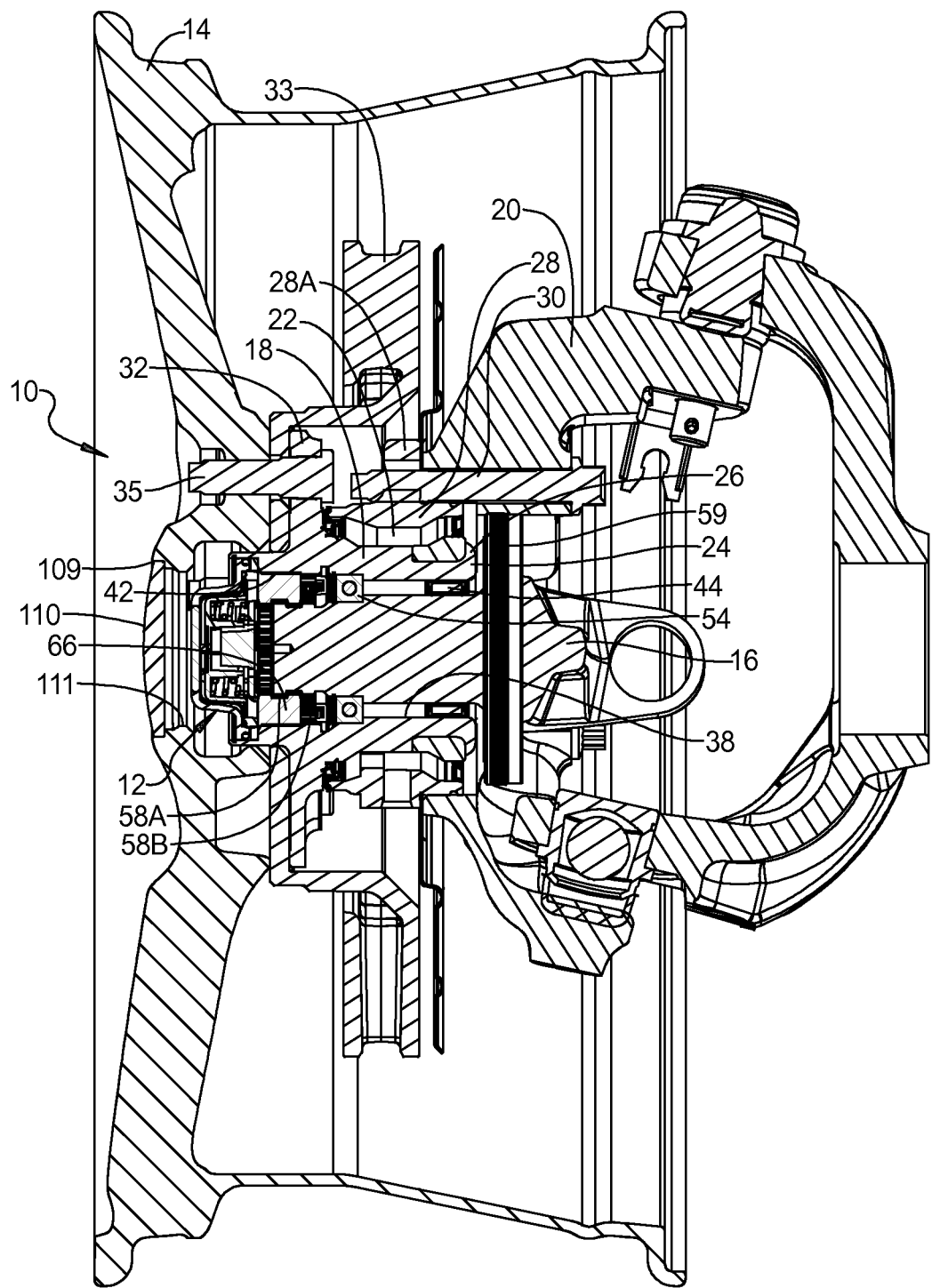
FIG. 1 is a cross-sectional view of a vacuum actuated hub lock mechanism applied to a spindle according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a wheel hub assembly 10 is shown including a pulse vacuum hub lock system 12 that couples a wheel 14 to the axle shaft 16. The wheel rim 14 is fixedly mounted to a wheel hub 18 which is rotatably supported on the axle shaft 16. It will be understood that the axle 16 and wheel hub 18 can be coupled or uncoupled to one another by the pulse vacuum hub lock system 12. A vacuum source (not shown) is connected to the pulse vacuum hub lock system 12 in a manner known in the art.

The wheel hub 18 is supported by a knuckle 20. A bearing assembly 22 is disposed between knuckle 20 and wheel hub 18. Wheel hub 18 includes an inboard end portion 24 which includes a roll form retention system 26 (as shown) which is disposed against the bearing assembly 22 or alternatively, a bearing adjusting nut could be used in place of the roll form retention system 26. The bearing assembly 22 includes an outer race portion 28 having an outwardly extending flange portion 28A that is fastened to the knuckle 20 by fasteners 30.

Figure 4:
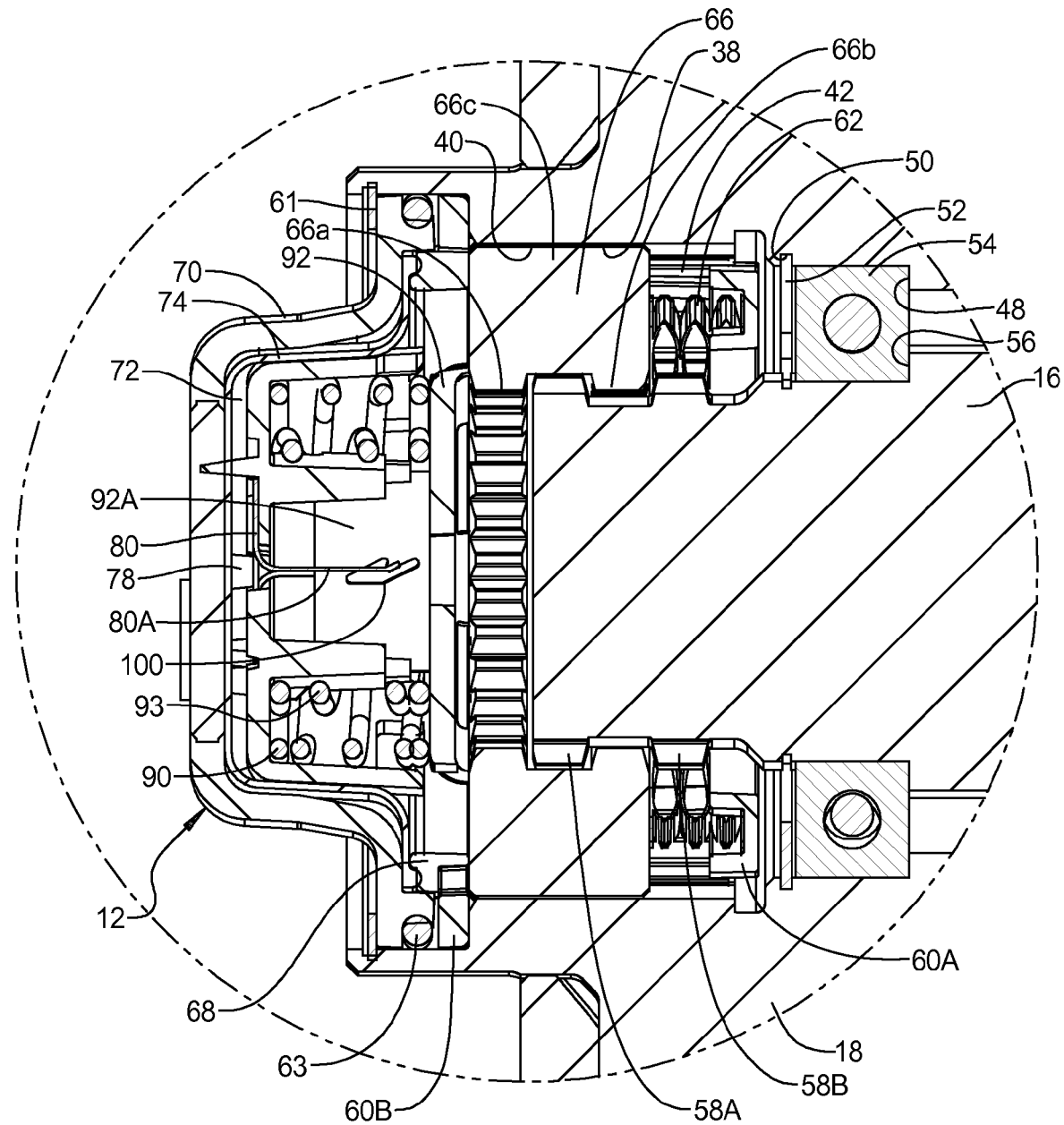
FIG. 4 is a detailed cross-sectional view of the pulse vacuum actuated hub lock mechanism according to the principles of the present invention shown in a disengaged position.
Figure 5:
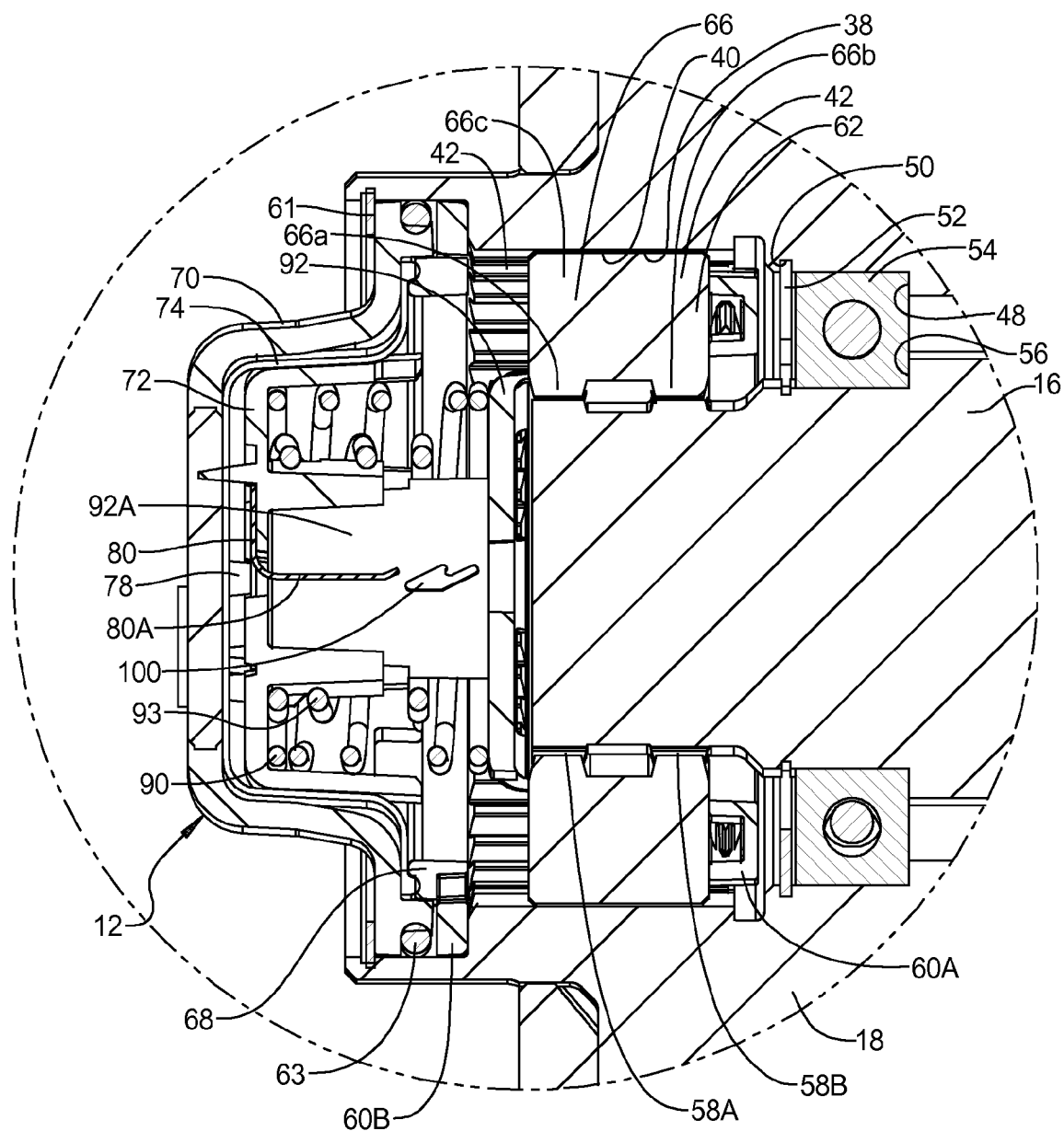
FIG. 5 is a detailed cross-sectional view of the pulse vacuum actuated hub lock mechanism according to the principles of the present invention shown in an engaged position.

The wheel hub 18 includes a radially extending flange portion 32 to which a brake rotor 33 and wheel rim 14 are fastened by fasteners 35. The wheel hub 18 includes a bore 38 extending therethrough for receiving the axle shaft 16 therein. The bore 38 includes an outboard portion 40 having internal splines 42, as best shown in FIGS. 4 and 5. As shown in FIG. 1, a needle bearing assembly 44 is provided on an inboard end of the bore 38 between the axle shaft 16 and wheel hub 18. As shown in FIGS. 4 and 5, the bore 38 includes a shoulder portion 48 and a recessed groove 50 which receives a retaining ring 52 which abuts against a bearing assembly 54. The bearing assembly 54 abuts against a shoulder 56 of the axle shaft 16 for retaining the axle shaft 16 in the bore 38. The axle shaft 16 includes two axially spaced apart rows of external splines 58A, 58B on an outboard end thereof. As shown in FIG. 1, a knuckle vacuum seal 59 is provided between the knuckle 20 and axle shaft 16.

Figure 2:
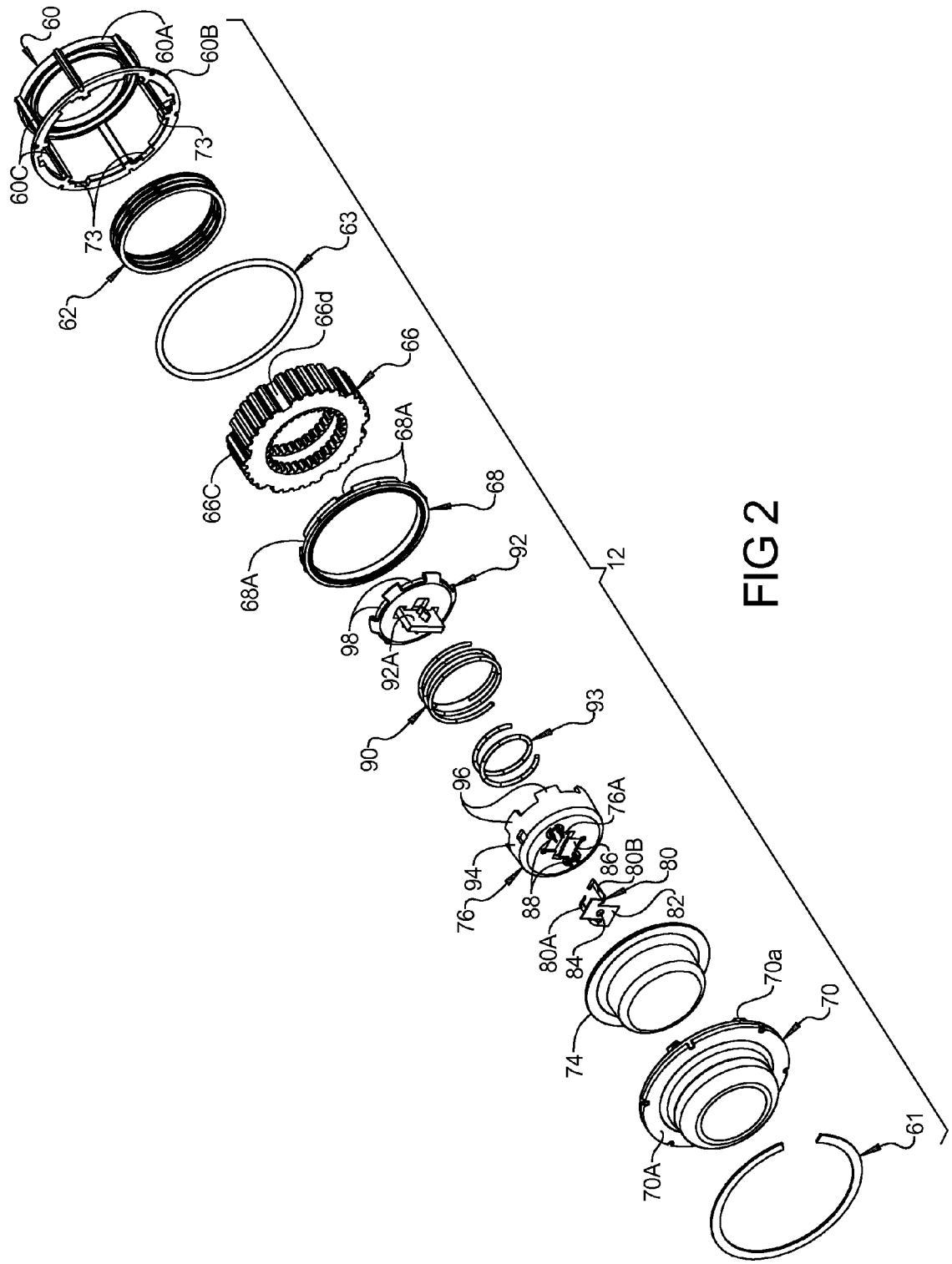
FIG. 2 is an exploded perspective view illustrating the assembly of the pulse vacuum actuated hub clutch lock according to the principles of the present disclosure.
Figure 3:
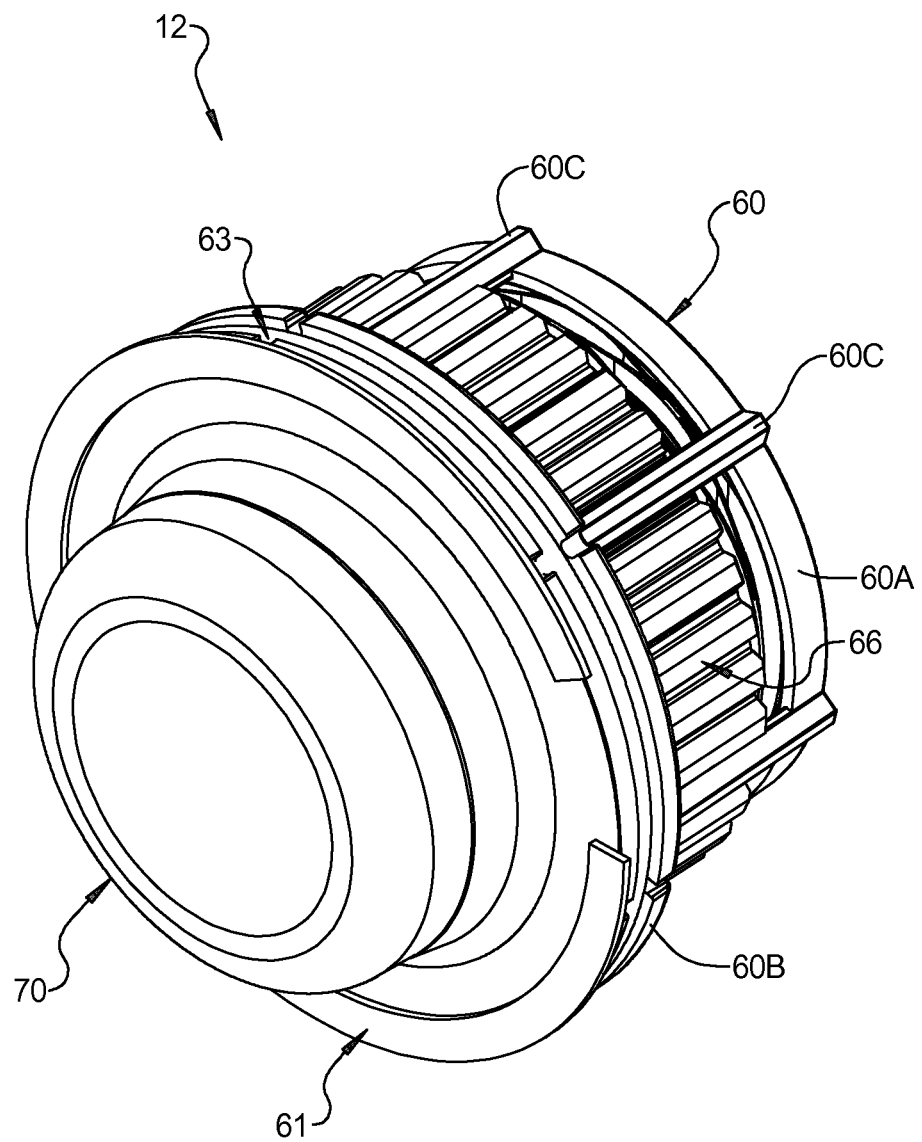
FIG. 3 is a perspective view illustrating the pulse vacuum actuated hub lock mechanism according to the principles of the present disclosure.

As shown in FIGS. 4 and 5, the pulse vacuum hub lock system 12 is provided as a cartridge unit that is inserted in the outboard end of bore 38 and retained therein by a retainer ring 61. An 0-ring 63 can be provided for sealing between the bore 38 and locking hub system 12. The pulse vacuum hub lock system 12, as best illustrated in the exploded perspective view of FIG. 2 includes an inner housing 60 that receives a disengagement spring 62 against a base portion 60A thereof. A clutch ring 66 is disposed against the disengagement spring 62 on an outboard side. The clutch ring 66 includes two axially spaced apart rows of internal splines 66a, 66b (best shown in FIG. 4) for selective alignment and engagement with the external splines 58A, 58B on the axle shaft 16. The clutch ring 66 includes external splines 66c engaged with internal splines 42 of the wheel hub 18. The outer surface of the clutch ring 66 further includes a plurality of recessed axial grooves 66d. A housing ring 68 is engaged with an outboard housing portion 60B of the inner housing 60 and secures the clutch ring 66 and disengagement spring 62 within the inner housing 60. The inner housing 60 includes a plurality of side supports 60C that connect the base portion 60A to the outboard housing portion 60B and are received in the recessed axial grooves 66d of the clutch ring 66, as best shown in FIG. 3.

An outer housing 70 is attached to the inner housing 60 and defines a chamber 72 therein, as shown in FIGS. 4 and 5. As shown in FIG. 2, the housing ring 68 includes pockets 68a that receive the side supports 60C. The outer housing 70 includes engagement fingers 70a that are received in recesses 73 provided in an inner surface of the outboard housing portion 60B of the inner housing 60. The outer housing 70 can be rotatably locked to the inner housing by the engagement fingers 70a. A diaphragm 74 is disposed in the chamber 72 and has an outer perimeter portion that is captured between an inner face of the outer flange 70A of the outer housing 70 and the housing ring 68. A primary piston 76 is attached to an interior projecting nub 78 of the diaphragm by a spring arm member 80. The spring arm member 80 includes a body portion 82 having a central aperture 84 for receiving the projecting nub 78 of the diaphragm 74. The body portion 82 of the spring arm member 80 is received in a recessed cavity 86 in an outboard face of the primary piston 76 and is retained therein by tangs 88 which are ultrasonically welded to the body portion 82. A pair of spring arms 80A, 80B extend from the body portion 82 and extend through an opening 76A in the primary piston 76.

Figure 6:
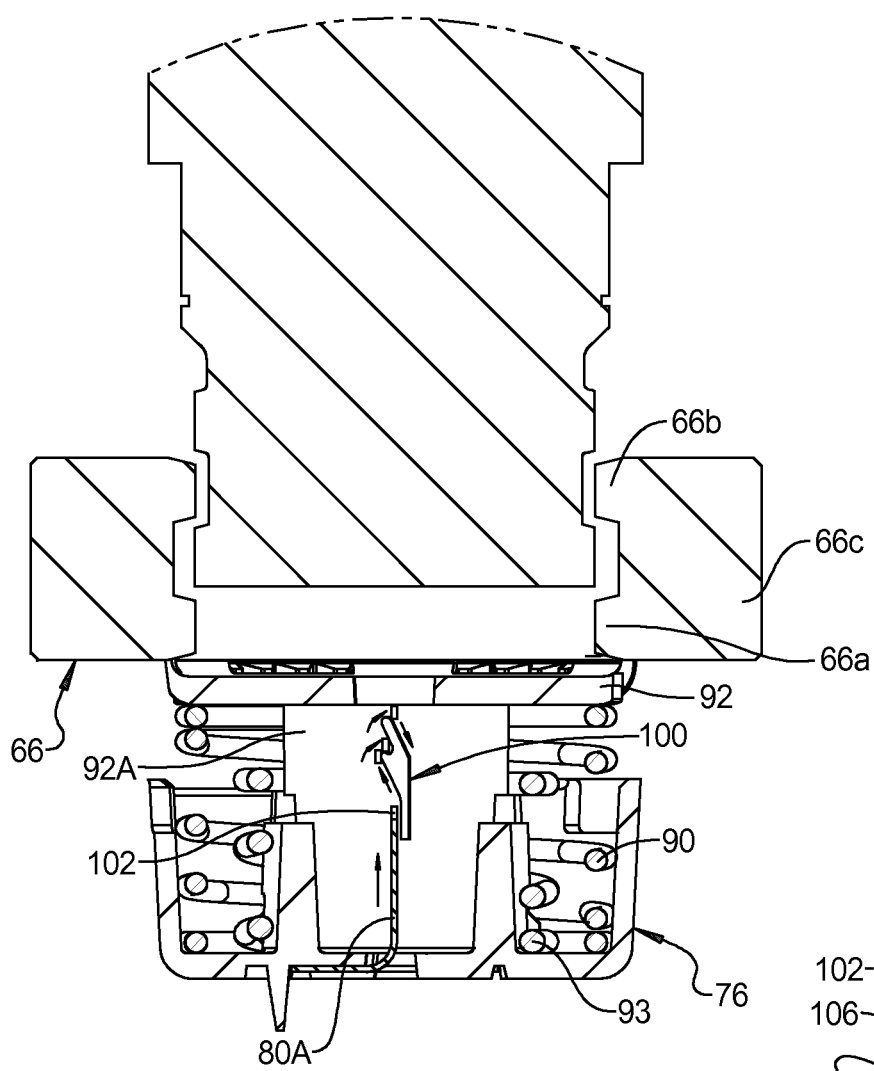
FIG. 6 is a partial cut-away view illustrating the engagement of the latch mechanism.
Figure 7:
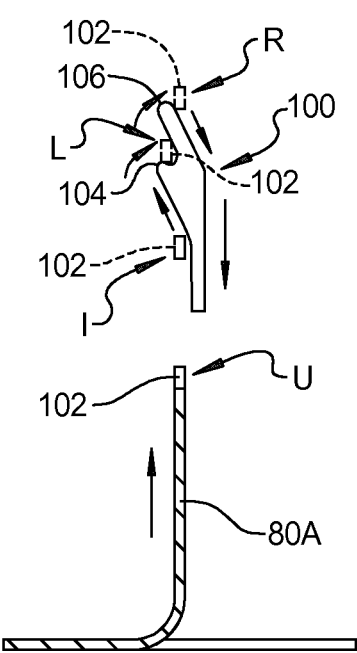
FIG. 7 is a detailed progressional view illustrating the engagement and disengagement of the latch mechanism.

A piston spring 90 and a concentric, smaller helper spring 93 are disposed between the primary piston 76 and a secondary piston 92. The primary piston 76 includes an annular side wall 94 with circumferentially spaced axially extending fingers 96 extending therefrom. The fingers 96 are received in corresponding circumferential gaps 98 in the perimeter of the secondary piston 92. The secondary piston 92 includes a center post 92A having a pair of latch features 100, best shown in FIGS. 6 and 7, for engaging with the engagement ends 102 of the pair of spring arms 80A, 80B of the spring arm member 80 for latching the secondary piston 92 to the primary piston 76 with the piston spring 90 and helper spring 93 compressed therebetween. The engagement ends 102 engage the latch features 100 with a first stable position and a return path. In particular, FIG. 7 illustrates the engagement end 102 of a spring arm 80A in various states of engagement/disengagement with respect to the latch feature 100. The engagement end 102 is shown in an un-latched first stable state as represented by position "U." By applying a vacuum pulse to the diaphragm 74 within the chamber 72, the spring member 80 and engagement end 102 are brought into engagement with latch feature 100 at an intermediate position "I." As the engagement continues, the engagement end 102 engages a ledge portion 104 of the latch feature to hold the primary piston 76 and secondary piston 92 in a second stable latched position "L." By applying a further pulse vacuum to the diaphragm 74, the primary piston 76 is moved further toward the secondary piston 92 until the engagement end 102 of the spring arm 80A reaches a release position "R" wherein the spring force of the spring arm 80A pulls the engagement end 102 around the tip end 106 of the latch feature 100 so that when the vacuum is released, the engagement end 102 follows a release path and is unlatched from the latch feature 100 to allow the primary piston 76 to move away from the secondary piston 92. When the primary and secondary pistons 72, 78 are latched, the clutch ring 66 is pushed by the disengagement spring 62 toward a disengaged position wherein the two rows of inner splines 66A, 66B are dis-engaged with the two rows of external splines 58A, 58B on the axle shaft 16 as shown in FIG. 4. When the primary and secondary pistons 72, 78 are unlatched, the clutch ring 66 is moved under the biasing force of the piston spring 90 and the helper spring 93 against the resistance of the disengagement spring 62 so that the two rows of inner splines 66A, 66B are engaged with the two rows of external splines 58A, 58B on the axle shaft 16 for transmitting torque from the axle shaft 16 to the wheel hub 18 via the clutch ring 66 as shown in FIG. 5.

The compact pulse vacuum live spindle hub lock 12 provides a cartridge design for ease of assembly. The multi-row engagement teeth 66A, 66B of the clutch ring 60 and the multi-row of external splines 58A, 58B on the axle shaft 16 reduce the amount of axial travel of the clutch ring 66. Utilizing the pulse vacuum engagement method allows the limited use of vacuum therefore allowing the vacuum system of the vehicle to have a lower durability cycle than a constant vacuum hub lock.

The present design uses the multi-row engagement splines 58A, 58B directly on the axle shaft 16 instead of on what is typically called an inner drive gear that would normally be installed over the constant shaft 16 with the clutch ring 66 engaging the inner drive gear. In the present design, the clutch ring 60 slides axially directly inside the wheel bearing hub 18 and clutches directly on the constant shaft 16, thereby eliminating the inner drive gear and its support. This then eliminates an additional source of friction in the system. The ball bearing 54 is installed inside the wheel bearing hub 18 to support the constant shaft 16. The constant shaft 16 is then axially located by the ball bearing 54 inside the wheel hub bearing 22, and also takes the thrust load of the system. The needle bearing 44 on the inboard side of the constant shaft 16 provides additional radial location of the constant shaft 16. The knuckle vacuum seal 59 is located between the constant shaft 16 and the knuckle 20. This seal 59 therefore has no relative motion during the 4×2 operation for the most fuel savings.

The present disclosure also uses two springs 90, 93 for the pulse vacuum engagement/disengagement system. The large, full range spring 90 is used throughout the full stroke of the primary piston 76, which is reacted against by the diaphragm 74. The full range piston spring 90 is what fully engages the clutch ring 66 onto the constant shaft 16. The secondary helper spring 93 is used to help reduce the full stroke of the primary piston 76 by requiring greater vacuum to fully compress the primary piston 76. The two spring system allows greater separation in the vacuum levels required to activate the pulse/latch system. This allows for increased tolerances of the system and therefore making it more robust while at the same time allowing for a smaller axial stack dimension.

The combination of the present disclosure allows for a minimal axial stack, making the present design a very dense package. The entire cartridge unit 12 including the housing assembly 60, 70, clutch ring 66, diaphragm 74, and piston assembly 76, 92 is disposed inboard of the opening 109 in the outboard surface of the wheel rim 14 that opens to aperture 111 in the wheel rim 14. This then allows for a traditional automatic outboard wheel end disconnect to be fully packaged behind a center cap 110 received in the aperture 111 of a traditional styled original equipment manufacturer wheel. The present design is as efficient of a design as is currently possible with a pulse vacuum actuated system, with a minimal amount of rotational drag.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pulse vacuum hub lock system for engaging a wheel hub to an axle shaft, comprising:
   a housing assembly;
   a clutch ring disposed in said housing assembly;
   a disengagement spring disposed between the housing assembly and the clutch ring;
   a diaphragm supported by said housing assembly;
   a piston assembly engaged with the diaphragm, the piston assembly including primary and secondary pistons having a latching device for releasably engaging the primary and secondary pistons in a latched position relative to one another;
   a piston spring disposed between the primary piston and secondary piston; and
   a helper spring disposed between the primary piston and the secondary piston.

2. The pulse vacuum hub lock system according to claim 1, wherein the piston spring provides resistance throughout a full stroke of the primary piston and the secondary spring provide resistance during only a portion of the stroke of the primary piston.

3. The pulse vacuum hub lock system according to claim 2, wherein said secondary piston is disposed against the clutch ring.

4. The pulse vacuum hub lock system according to claim 2, wherein the housing assembly defines a cartridge unit supporting the clutch ring, diaphragm, primary piston, secondary piston, spring arm member, piston spring, helper spring, and disengagement spring, wherein the cartridge unit is adapted to be received in a bore of the wheel hub and the clutch ring includes external splines that are engaged with internal splines of the bore and includes a pair of axially spaced internal spline sets that can be moved into engagement and out of engagement with a pair of axially spaced external spline sets on the axle shaft.

5. The pulse vacuum hub lock system according to claim 1, wherein the latching device includes a spring arm member attached to the primary piston and having a first and a second spring arm each disposed on opposite sides of a post of the secondary piston and engageable with first and second latch features on opposite surfaces of the post of the secondary piston.

6. The pulse vacuum hub lock system according to claim 4, wherein the spring arm member includes a body portion and the first and second spring arms extend from the body portion through an opening in the primary piston.

7. The pulse vacuum hub lock system according to claim 1, wherein the secondary piston includes a plurality of circumferential gaps in a perimeter surface and the primary piston includes a plurality of fingers that are received in the circumferential gaps of the secondary piston.

8. A pulse vacuum hub lock system, comprising:
a wheel hub having internal splines;
an axle shaft having a pair of axially spaced external spline sets;
a cartridge housing assembly received in a bore in the wheel hub;
a clutch ring disposed in said cartridge housing assembly, the clutch ring having external splines for engagement with the internal splines of the wheel hub and a pair of axially spaced internal spline sets for selective direct engagement with the axially spaced external splines of the axle shaft;
a diaphragm supported by said cartridge housing assembly;
a piston assembly received in said cartridge housing assembly and engaged with the diaphragm, the piston assembly including primary and secondary pistons having a spring disposed therebetween for biasing the primary and secondary pistons in opposite directions and a latching device for releasably engaging the primary and secondary pistons in a latched position relative to one another, wherein the cartridge housing assembly with the clutch ring, the diaphragm and the piston assembly therein is received in the bore of the wheel hub as a unitary assembly.

9. The pulse vacuum hub lock system according to claim 8, wherein the cartridge housing assembly includes an inner housing and an outer housing attached to the inner housing, the inner housing including a base portion and an outboard housing portion connected to the base portion by a plurality of spaced side supports.

10. The pulse vacuum hub lock system according to claim 9, wherein said clutch ring includes an outer surface including a plurality of recessed axial grooves that receive the plurality of spaced side supports.

11. The pulse vacuum hub lock system according to claim 8, further comprising a wheel rim mounted to the wheel hub, the wheel rim defining a center aperture with an opening defined by an outboard surface of the wheel rim, wherein the entire cartridge housing assembly is disposed inboard of the opening in the outboard surface of the wheel rim.

12. The pulse vacuum hub lock system according to claim 8, further comprising a disengagement spring disposed between a base portion of the cartridge housing assembly and the clutch ring.

13. The pulse vacuum hub lock system according to claim 12, wherein said secondary piston is disposed against the clutch ring.

14. The pulse vacuum hub lock system according to claim 8, wherein the latching device includes a spring arm member having first and second spring arms each disposed on opposite sides of a post of the secondary piston and engageable with first and second latch features on opposite surfaces of the post of the secondary piston.

15. The pulse vacuum hub lock system according to claim 14, wherein the spring arm member includes a body portion attached to the primary piston and said first and second spring arms extend from the body portion through an opening in the primary piston.

16. The pulse vacuum hub lock system according to claim 8, wherein the secondary piston includes a plurality of circumferential gaps in a perimeter surface and the primary piston includes a plurality of fingers that are received in the circumferential gaps of the secondary piston.

17. A pulse vacuum hub lock system, comprising;
a wheel hub having internal splines;
an axle shaft having a pair of axially spaced external spline sets;
a housing assembly received in a bore in the wheel hub;
a clutch ring disposed in said housing assembly, the clutch ring having external splines for engagement with the internal splines of the wheel hub and a pair of axially spaced internal splines for selective direct engagement with the axially spaced external splines of the axle shaft;
a diaphragm supported by said housing assembly;
a piston assembly engaged with the diaphragm, the piston assembly including primary and secondary pistons having a spring disposed therebetween for biasing the primary and secondary pistons in opposite directions and a latching device for releasably engaging the primary and secondary pistons in a latched position relative to one another; and
a wheel rim mounted to the wheel hub, the wheel rim defining a center aperture with an opening defined by an outboard surface of the wheel rim, wherein the entire housing assembly, clutch ring, diaphragm and piston assembly is disposed inboard of the opening in the outboard surface of the wheel rim.

18. The pulse vacuum hub lock system according to claim 17, further comprising a disengagement spring disposed between a base portion of the housing assembly and the clutch ring.

19. The pulse vacuum hub lock system according to claim 17, wherein the secondary piston is disposed against the clutch ring.

20. The pulse vacuum hub lock system according to claim 17, wherein the housing assembly defines a cartridge unit supporting the clutch ring, diaphragm, primary piston, secondary piston and the latching device, wherein the cartridge unit is received in a bore of the wheel hub.

21. The pulse vacuum hub lock system according to claim 17, wherein the secondary piston includes a plurality of circumferential gaps in a perimeter surface and the primary piston includes a plurality of fingers that are received in the circumferential gaps of the secondary piston.

22. The pulse vacuum hub lock system according to claim 17, further comprising a piston spring disposed between the primary piston and the secondary piston and a helper spring disposed between the primary piston and the secondary piston, the piston spring providing resistance throughout a full stroke of the primary piston and the secondary spring providing resistance during only a portion of the stroke of the primary piston.

* * * * *

UNITED STATES PATENT AND TRADEMARK OFFICE
CERTIFICATE OF CORRECTION

| | | |
|---|---|---|
| PATENT NO. | : 9,091,307 B2 | Page 1 of 1 |
| APPLICATION NO. | : 14/156774 | |
| DATED | : July 28, 2015 | |
| INVENTOR(S) | : Craig Feusse et al. | |

It is certified that error appears in the above-identified patent and that said Letters Patent is hereby corrected as shown below:

In the claims,

In Claim 6:
On line 22, remove --4-- and insert --5-- after the word "claim".

Signed and Sealed this
Twelfth Day of January, 2016

Michelle K. Lee
*Director of the United States Patent and Trademark Office*